United States Patent Office 3,145,214
Patented Aug. 18, 1964

3,145,214
ISOTHIAZOL-5-YL LITHIUM DERIVATIVES
Ronald Slack, Chelsea, London, Sydney Leonard Squires, East Ham, London, and Kenneth Robert Harry Wooldridge, Brentwood, England, assignors to May & Baker Limited, Essex, England, a British company
No Drawing. Filed May 15, 1963, Ser. No. 283,657
9 Claims. (Cl. 260—302)

This invention relates to new isothiazole derivatives.
According to the present invention, there are provided new isothiazolyl lithium derivatives of the general formula:

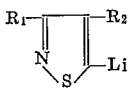

I wherein $R_1$ represents a hydrogen atom, an alkyl group containing up to 6 carbon atoms, or a carboxyl group, and $R_2$ represents a hydrogen or halogen atom, an alkyl group containing up to 6 carbon atoms, or a carboxyl group. Preferred compounds are those in which $R_1$ represents a hydrogen atom or a methyl group, and $R_2$ represents a hydrogen or halogen atom or a methyl group, for example, isothiazol-5-yl lithium, 4-methylisothiazol-5-yl lithium, 3-methylisothiazol-5-yl lithium, 4-bromo-3-methylisothiazol-5-yl lithium, 4-chloroisothiazol-5-yl lithium, 4-bromoisothiazol-5-yl lithium, 4-chloro-3-methylisothiazol-5-yl lithium and 3-methyl-4-iodoisothiazol-5-yl lithium.

According to a feature of the invention, the lithium derivatives of Formula I are prepared by the reaction of an isothiazole derivative of the formula:

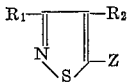

II (wherein $R_1$ and $R_2$ are as hereinbefore defined, and Z represents a hydrogen or halogen atom) with an organolithium compound, such as an alkyl or aryl lithium, in an ether solvent medium. The reaction is normally effected at a temperature well below 0° C. and advantageously between —30° and —70° C. The preferred organolithium reactants are butyl lithium and phenyl lithium, and the preferred ether solvent is tetrahydrofuran. In the case of butyl lithium the reaction is preferably effected at a temperature between —60° C. and —70° C. in tetrahydrofuran.

The preparation of isothiazole derivatives of Formula II, in which $R_1$ represents a hydrogen atom or an alkyl group, $R_2$ represents a hydrogen atom, an alkyl group, or a carboxy group, and Z is as defined, has been described in the literature (Adams and Slack, Journal of the Chemical Society, 3061–3072 (1959), and Hubenett, Flock and Hofman, Angew. Chem., 74 (1962), 653). The remaining compounds may be prepared by application of methods known per se. Thus, the isothiazole compounds of Formula II, in which $R_2$ represents a halogen atom, may be prepared by halogenation of the corresponding compounds of Formula II, in which $R_2$ represents a hydrogen atom, according to known methods for the nuclear halogenation of aromatic compounds. When Z represents a hydrogen atom, they may also be prepared by the decarboxylation of isothiazole-5-carboxylic acids of the formula:

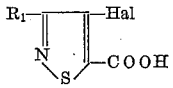

III wherein Hal represents a halogen atom and $R_1$ is as hereinbefore defined.

The isothiazole-5-carboxylic acids of Formula III may themselves be prepared from 5-aminoisothiazoles of the general formula:

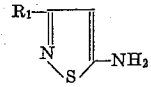

IV (wherein in $R_1$ is as hereinbefore defined) in accordance with the following reaction scheme:

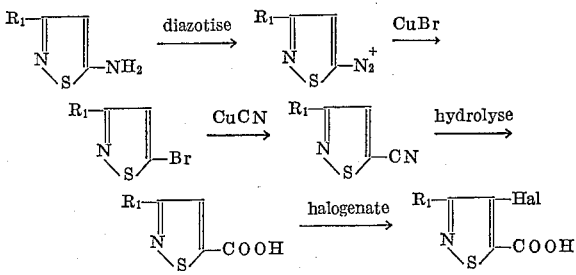

(wherein $R_1$ and Hal are as hereinbefore defined). A 5-aminoisothiazole is diazotised and reacted with cuprous bromide to give the corresponding 5-bromoisothiazole. Reaction of this bromo compound with cuprous cyanide followed by hydrolysis of the resulting 5-cyanoisothiazole gives an isothiazole-5-carboxylic acid. Halogenation of the acid according to known methods gives the required halogeno-isothiazole-5-carboxylic acid of Formula III.

The 5-aminoisothiazoles of Formula IV may be prepared as described by Adams and Slack (loc. cit.) from the β-iminonitriles of the formula:

$$R_1-\underset{\underset{NH}{\|}}{C}-CH_2CN$$

V wherein $R_1$ is as hereinbefore defined. The synthesis is effected by reaction of the nitriles of Formula V with hydrogen sulphide to produce the corresponding β-iminothioamides of the formula:

$$R_1-\underset{\underset{NH}{\|}}{C}-CH_2CSNH_2$$

VI which, on oxidation with chloramine, hydrogen peroxide or a persalt such as ammonium or potassium persulphate, give the 5-aminoisothiazoles of formula IV.

The isothiazoles of Formula II, in which $R_2$ and Z are hydrogen atoms, may be prepared from the 5-aminoisothiazoles of Formula IV by reacting the corresponding diazonium salts with cuprous oxide in the presence of hypophosphorous acid. Alternatively, they may be prepared by decarboxylating an isothiazole-5-carboxylic acid of the formula:

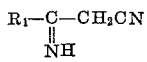

VII wherein $R_1$ is as hereinbefore defined. The compounds of Formula VII may be prepared as indicated above from 5-aminoisothiazoles of Formula IV.

The isothiazole derivatives of Formula II, in which $R_1$ represents a hydrogen atom or an alkyl group, $R_2$ represents the carboxyl group and Z represents a hydrogen atom, may be prepared by the decarboxylation of an isothiazole-4,5-dicarboxylic acid of the formula:

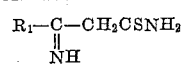

VIII wherein $R_1$ is as hereinbefore defined) by heating, e.g. at a temperature between 180 and 200° C., alone or in an inert organic solvent medium having a high boiling point, for example, a mixture of diphenyl ether and diphenyl.

The isothiazole-4,5-dicarboxylic acids of Formula VIII may themselves be prepared from alkyl 5-aminoisothiazole-4-carboxylates of the formula:

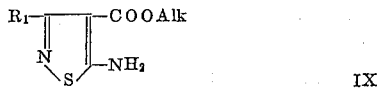

IX (wherein Alk represents an alkyl group containing up to 6 carbon atoms, such as methyl or ethyl, and $R_1$ is as hereinbefore defined) in accordance with the following reaction scheme:

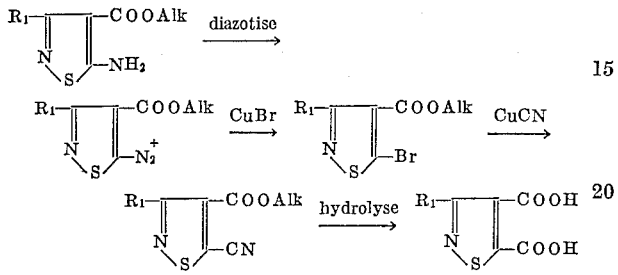

wherein Alk and $R_1$ are as hereinbefore defined. An alkyl 5-aminioisothiazole-4-carboxylate of Formula IX is diazotised and the resulting diazonium salt reacted with cuprous bromide. The alkyl 5-bromoisothiazole-4-carboxylate so obtained is reacted with cuprous cyanide and the resulting alkyl 5-cyanoisothiazole-4-carboxylate hydrolysed to give the required dicarboxylic acid of Formula VIII.

The alkyl 5-aminoisothiazole-4-carboxylates of Formula IX may themselves be obtained by oxidising a β-iminothioamide of the formula:

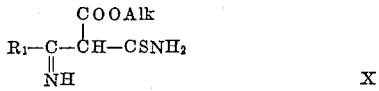

X (wherein Alk and $R_1$ are as hereinbefore defined) with chloramine, hydrogen peroxide or a per-salt such as ammonium or potassium persulphate. The thioamides of Formula X may be conveniently prepared by reacting an iminonitrile of the formula:

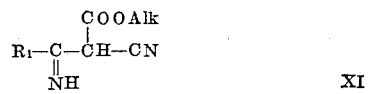

XI (wherein Alk and $R_1$ are as hereinbefore defined) with hydrogen sulphide, or reacting a β-imino ester of the formula:

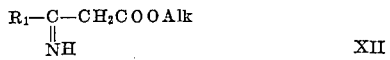

XII (wherein Alk and $R_1$ are as hereinbefore defined) with thiocyanic acid which may be prepared in situ, e.g. with potassium or sodium thiocyanate in the presence of a mineral acid.

The compounds of Formula II, in which $R_1$ represents a carboxyl group, $R_2$ represents a hydrogen or halogen atom or a carboxyl group and Z is as hereinbefore defined, may be prepared by oxidation of the corresponding compounds where $R_1$ represents an alkyl group. The compounds of Formula II, in which both $R_1$ and $R_2$ represent carboxyl groups, may alternatively be prepared by oxidation of the benz(c)-isothiazole.

The isothiazolyl lithiums of Formula I are useful intermediates for the preparation of a large number of isothiazole derivatives. They are solids which can be stored in vacuo at room temperature without decomposition. They have indefinite melting points and are best stored in solution in an ether in an inert atmosphere. When they are being employed as chemical intermediates, they are not normally isolated but used in situ in the solvent of their preparation.

The useful reactions undergone by the isothiazolyl lithiums of Formula I include the following:

(i) Reaction with carbon dioxide gives the acids of the formula:

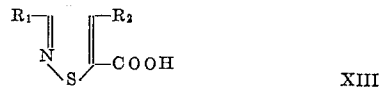

XIII wherein $R_1$ and $R_2$ are as hereinbefore defined.

(ii) Reaction with an amide of the formula:

XIV (wherein Q represents a hydrogen atom or an alkyl group, and $R_3$ and $R_4$ represent alkyl groups) gives the isothiazolyl aldehydes and ketones of the formula:

XV wherein Q, $R_1$ and $R_2$ are as hereinbefore defined.

Those compounds of Formula XIII and XV in which $R_1$ represents an alkyl group and $R_2$ represents a hydrogen or halogen atom, are of importance as intermediates for the preparation (by application of methods known per se) of thiosemicarbazones of the formula:

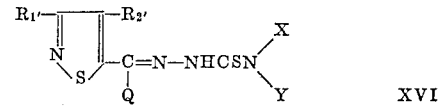

XVI (wherein X and Y are the same or different and each represents a hydrogen atom or an alkyl, hydroxyalkyl or alkoxyalkyl group, or X and Y together with the nitrogen atom to which they are attached collectively represent a six-membered saturated mononuclear heterocyclic ring such as morpholino or piperazino, $R_{1'}$ is an alkyl group, $R_{2'}$ is a hydrogen or halogen atom and Q is as hereinbefore defined) which possess useful antiviral properties, having, in particular, high activity against the pox group of viruses, for example, variolas major and vaccinia.

(iii) Reaction with a halogen or halide of the formula $R_5Hal$ (wherein $R_5$ represents a halogen atom or an alkyl, cycloalkyl, cycloalkyl-alkyl, or aralkyl group, and Hal is as hereinbefore defined) produces the isothiazole derivatives of the formula:

XVII wherein $R_1$, $R_2$ and $R_5$ are as hereinbefore defined. It will be appreciated that when it is desired to produce a compound of Formula XVII in which $R_5$ is a halogen atom, the reagent $R_5Hal$ will be the elemental halogen, such as chlorine, bromine or iodine.

The following examples illustrate the invention.

*Example I*

Isothiazole (1.27 g.) in dry tetrahydrofuran (25 ml.) was cooled to —70° C. and treated over 5 minutes with a 14.91% w/w solution of butyl lithium in n-hexane (10.5 g.). The reaction was carried out in an atmosphere of nitrogen with the reaction mixture stirred mechanically. Stirring was continued for a further 15 minutes at —70° C. Isothiazol-5-yl lithium separated and was collected by filtration at a temperature between —30° and —70° C. It was obtained as a white solid, tending to discolour in air, which can be stored in vacuo at room temperature. It had an indefinite melting point so its identity was confirmed by the following reactions:

(i) A suspension of isothiazol-5-yl lithium in a mixture of tetrahydrofuran and n-hexane (prepared as described above) was treated with a large excess of powdered solid carbon dioxide at —70° C. After stirring the reaction mixture for 30 minutes at —70° C., it was allowed to attain room temperature. An excess of 2 N hydrochloric acid was added and, after shaking, the two layers were separated and the aqueous phase further extracted with two portions of diethyl ether. The combined ether and tetrahydrofuran extracts were dried over anhydrous magnesium sulphate, the mixture filtered, and the filtrate evaporated to dryness. The resulting solid was dissolved in aqueous sodium hydroxide, the solution filtered, and the filtrate acidified with 2 N hydrochloric acid. The solid which separated was recrystallised from water to give isothiazole-5-carboxylic acid (0.4 g.), M.P. 202–204° C.

(ii) A suspension of isothiazol-5-yl lithium, prepared as described above from isothiazole (8.7 g.) in dry tetrahydrofuran and a 14.91% w./w. solution of butyl lithium in n-hexane (50 g.), was treated with dry dimethylformamide at —70° C. After stirring the reaction mixture for 30 minutes, it was allowed to warm up to room temperature and acidified with 2 N hydrochloric acid. After shaking thoroughly, the two layers were separated and the aqueous phase further extracted with two portions of diethyl ether. The combined ether and tetrahydrofuran extracts were dried over anhydrous magnesium sulphate, the mixture filtered, and the filtrate evaporated to dryness to give crude isothiazole-5-caboxaldehyde. Distillation gave isothiazole-5-carboxyaldehyde (8.5 g.), B.P. 95–98° C./32 mm. Treatment with thiosemicarbazide in refluxing ethanol for 4 hours gave isothiazole carboxaldehyde thiosemicarbazone (M.P. 188–189° C. after recrystallisation from ethanol).

(iii) A suspension of isothiazol-5-yl lithium, prepared as described above from isothiazole (8.7 g.) in dry tetrahydrofuran and a 14.91% w./w. solution of butyl lithium in n-hexane (50 g.), was treated with methyl iodide (15.85 g.). After stirring for 30 minutes, the reaction mixture was allowed to warm up to room temperature and acidified with 2 N hydrochloric acid. After shaking thoroughly, the two layers were separated and the aqueous layer was further extracted with two portions of diethyl ether. The combined ether and tetrahydrofuran extracts were dried over magnesium sulphate, filtered, and fractionally distilled to give 5-methylisothiazole (4.0 g.), B.P. 44–46° C./18 mm.

(iv) A suspension of isothiazol-5-yl lithium, prepared as described above from isothiazole (8.7 g.) in dry tetrahydrofuran and a 14.91% w./w. solution of butyl lithium in n-hexane (50 g.), was treated with bromine (24 g.). After stirring for 15 minutes, the reaction mixture was allowed to warm up to room temperature and acidified with 2 N hydrochloric acid. The organic layer was separated, and the aqueous layer further extracted with diethyl ether. The combined extracts were dried over magnesium sulphate and fractionally distilled to give 5-bromoisothiazole (5.6 g.), B.P. 56° C./23 mm.

*Example II*

Proceeding as described in Example I, 4-methylisothiazole (1.5 g.) in tetrahydrofuran (25 ml.) was reacted with a 14.91% w./w. solution of butyl lithium in n-hexane (10.5 g.) to give 4-methylisothiazol-5-yl lithium as a white solid. It was characterised by its reactions as follows:

(i) Proceeding as described in Example I(i), 4-methylisothiazol-5-yl lithium with carbon dioxide gave 4-methylisothiazole-5-carboxylic acid, M.P. 178–180° C. (40% yield). The identity of this acid was confirmed in the following manner:

4-methylisothiazole-5-carboxylic acid (1.5 g.) in a boiling solution of sodium carbonate (0.75 g.) in water (120 ml.) was treated portionwise with potassium permanganate (6 g.). After refluxing the mixture for 2 hours, the mixture was filtered hot. The cooled filtrate was acidified to pH 1 with concentrated sulphuric acid, and continuously extracted with diethyl ether over 16 to 20 hours. Evaporation of the ethereal extract gave a solid, which was recrystallised from benzene to give isothiazole-4,5-dicarboxylic acid, M.P. 136–139° C. This was shown by mixed melting point and identity of infra-red spectra to be the same as the material obtained from the oxidation of 5-aminobenz(d)-1,2-isothiazole.

(ii) Proceeding as described in Example I(ii), 4-methylisothiazol-5-yl lithium with dimethylformamide gave 4-methylisothiazole-5-carboxaldehyde, isolated as the thiosemicarbazone, M.P. 215–218° C. (26% yield).

*Example III*

Proceeding as described in Example I, isothiazole-4-carboxylic acid (1.0 g.) in tetrahydrofuran (25 ml.) was reacted with a 14.9% w./w. solution of butyl lithium in n-hexane (15 g.) to give the lithium salt of the 5-lithium derivative of isothiazole-4-carboxylic acid as a white solid. It was characterised by its reaction with carbon dioxide as follows:

Proceeding as described in Example I(i), the 5-lithium derivative of isothiazole-4-carboxylic acid with carbon dioxide gave isothiazole-4,5-dicarboxylic acid. This was isolated as the monosodium salt monohydrate by dissolving the crude di-acid in water, filtering the solution and adjusting the pH of the filtrate to 4 with 2 N aqueous sodium hydroxide. The sodium salt separated and was recrystallised from water as the monohydrate, M.P. 271–273° C. (15% yield). This was shown by identity of infra-red spectra to be the same as the material obtained from the oxidation of 5-aminobenz(d)-1,2-isothiazole.

*Example IV*

Proceeding as described in Example I, 3-methylisothiazole (3 g.) in tetrahydrofuran (50 ml.) was reacted with a 14.9% w./w. solution of butyl lithium in n-hexane (25 g.) to give 3-methylisothiazol-5-yl lithium as a white solid. It was characterised by its reactions as follows:

(i) Proceeding as described in Example I(i), 3-methylisothiazol-5-yl lithium was reacted with carbon dioxide to give 3-methylisothiazole-5-carboxylic acid, M.P. 206–208° C. (54% yield).

(ii) Proceeding as described in Example I(ii), 3-methylisothiazol-5-yl lithium was reacted with dimethylformamide to give 3-methylisothiazole-5-carboxaldehyde (38% yield), B.P. 48–50° C./0.04 to 0.05 mm. The corresponding thiosemicarbazone, i.e. 3-methyl-isothiazole-5-carboxaldehyde thiosemicarbazone, melted at 204–207° C.

(iii) Proceeding as described in Example I(iii), 3-methylisothiazol-5-yl lithium was reacted with methyl iodide to give 3,5-dimethylisothiazole (37% yield), B.P. 152–158° C.

*Example V*

Proceeding as described in Example I, 4-bromo-3-methylisothiazole (5.34 g.) in tetrahydrofuran (75 ml.) was reacted with a 14.9% w./w. solution of butyl lithium in n-hexane (25 g.) to give 4-bromo-3-methylisothiazol-5-yl lithium as a white solid. It was characterised by its reactions as follows:

(i) Proceeding as described in Example I(i), 4-bromo-3-methylisothiazol-5-yl lithium was reacted with carbon dioxide to give 4-bromo-3-methylisothiazole-5-carboxylic acid, M.P. 194–197° C. (29% yield).

(ii) Proceeding as described in Example I(ii), 4-bromo-3-methylisothiazol-5-yl lithium was reacted with dimethylformamide to give 4-bromo-3-methylisothiazole-5-carboxaldehyde, M.P. 65–67° C. (9.3% yield). The corresponding 4-bromo-3-methylisothiazole-5-carboxaldehyde thiosemicarbazone melted at 231–235° C.

(iii) A solution of 4-bromo-3-methylisothiazol-5-yl lithium prepared as described above from 4-bromo-3-methylisothiazole (3.56 g.) in dry tetrahydrofuran (50 ml). and butyl lithium (14 g. of a 14.91% w./w. solution in n-hexane), was reacted with methyl iodide (2 ml.) over 15 minutes at −70° C. with stirring in an atmosphere of nitrogen. After stirring at −70° C. for a further 50 minutes, the reaction mixture was allowed to warm slowly to room temperature. After standing at room temperature for about 16 hours the mixture was refluxed for 1 hour, cooled and shaken with an excess of 2 N hydrochloric acid. The resulting mixture was extracted with three portions of diethyl ether and the combined extracts dried over anhydrous magnesium sulphate. Evaporation of the solvent left a dark oil which was distilled under reduced pressure to give 4-bromo-3,5-dimethylisothiazole (0.6 g.), B.P. 37° C./0.4 mm.

In a similar way there were prepared 4-bromo-3-methyl-5-ethylisothiazole (34% yield), B.P. 100–105° C./18 mm.; 4-bromo-3-methyl-5-propylisothiazole (28% yield), B.P. 128–130° C./17 mm., and 5-benzyl-4-bromo-3-methylisothiazole (13% yield), B.P. 123–125° C./0.2 mm.

(iv) A solution of 4-bromo-3-methylisothiazole (8.9 g.) in dry tetrahydrofuran (100 ml.) and butyl lithium (23.6 g. of a 14.9% w./w. solution in n-hexane), was reacted with bromine (3 ml.) at −70° C. The resulting mixture was allowed to attain room temperature, water was then added, and the organic layer separated and dried over anhydrous magnesium sulphate. After filtration and evaporation of the filtrate to dryness, the residue was fractionally distilled under reduced pressure to give 4,5-dibromo-3-methylisothiazole (4.3 g., 34%), B.P. 55–60° C./0.1 mm.

*Example VI*

Proceeding as described in Example I, 4-chloroisothiazole (12 g.) was reacted with a 14.91% w./w. solution of butyl lithium in n-hexane (50 g.) to give 4-chloroisothiazol-5-yl lithium as a white solid. It was characterised as follows:

(i) Proceeding as described in Example I(i), 4-chloro-isothiazol-5-yl lithium with carbon dioxide gave 4-chloro-isothiazole-5-carboxylic acid (68% yield), M.P. 167–168° C. with decomposition.

(ii) Proceeding as described in Example I(ii), 4-chloro-isothiazol-5-yl lithium with dimethylformamide gave 4-chloro-isothiazole-5-carboxaldehyde (73% yield), M.P. 73–74° C., the thiosemicarbazone of which melted at 215–216° C.

*Example VII*

Proceeding as described in Example I, 4-bromoisothiazole gave 4-bromoisothiazol-5-yl lithium. It was characterised as follows:

(i) Reaction with carbon dioxide gave 4-bromoisothiazole-5-carboxylic acid (70% yield), M.P. 180–181° C. with decomposition.

(ii) Reaction with dimethylformamide gave 4-bromo-5-formylisothiazole (65% yield), M.P. 38–39° C., the thiosemicarbazone of which melted at 220–221° C.

*Example VIII*

Proceeding as described in Example I, 4-chloro-3-methylisothiazole gave 4-chloro-3-methylisothiazol-5-yl lithium. It was characterised as follows:

(i) With carbon dioxide it gave 4-chloro-3-methylisothiazole-5-carboxylic acid (75%), M.P. 193–195° C. with decomposition.

(ii) With dimethylformamide it gave 4-chloro-3-methylisothiazole-5-carboxaldehyde (47% yield), M.P. 48–50° C., the thiosemicarbazone of which melted at 231–233° C.

*Example IX*

Proceeding as described in Example I, 3-methyl-4-iodo-isothiazole gave 3-methyl-4-iodoisothiazol-5-yl lithium as a white solid. It was characterised as follows:

(i) With carbon dioxide it gave 3-methyl-4-iodoisothiazole-5-carboxylic acid (58% yield), M.P. 196–198° C. with decomposition.

(ii) With dimethylformamide it gave 3-methyl-4-iodo-isothiazole-5-carboxaldehyde (68%), M.P. 90–92° C., the thiosemicarbazone of which melted at 233–235° C.

*Example X*

Proceeding as described in Example I, 3-methylisothiazole-4-carboxylic acid (10 g.) and a solution of 14.91% w./w. butyl lithium in n-hexane (80 g.) gave the lithium salt of 5-lithio-3-methylisothiazole-4-carboxylic acid. It was characterised as follows:

(i) With carbon dioxide it gave 3-methylisothiazole-4,5-dicarboxylic acid (15% yield), M.P. 160° C.

(ii) With dimethylformamide it gave 5-formyl-3-methyl isothiazole-4-carboxylic acid (25% yield), M.P. 190–200° C., the thiosemicarbazone of which melted at 256° C.

(iii) With bromine it gave 5-bromo-3-methylisothiazole-4-carboxylic acid (52% yield), M.P. 223–225° C.

*Example XI*

In a similar way to that described in Example III, isothiazole-3-carboxylic acid was converted to the 5-lithium derivative which in turn gave isothiazole-3,5-dicarboxylic acid (15% yield), M.P. 205° C. decomposition, on treatment with solid carbon dioxide.

Isothiazole-3-carboxylic acid was prepared as follows:

To a stirred solution of 3-methylisothiazole (30 g.) in concentrated sulphuric acid (540 ml.) was added chromium trioxide (90 g.) in small portions over a period of 12 hours. During the addition, the temperature of the reaction mixture was kept at 28–30° C. by cooling. The mixture was allowed to stand for 18 hours at room temperature and then poured on to ice. Repeated extraction with diethyl ether afforded isothiazol-3-carboxylic acid (26.5 g.), M.P. 135–137° C.

*Example XII*

Treatment of 5-bromo-3-methylisothiazole (8.9 g.) in tetrahydrofuran (50 ml.) with butyl lithium (3.55 g.) in tetrahydrofuran (100 ml.) at −70° C. in an atmosphere of nitrogen gave 3-methyl-isothiazol-5-yl lithium, which was characterised as in Example IV by reaction with carbon dioxide to give 3-methylisothiazole-5-carboxylic acid.

We claim:
1. A compound of the formula:

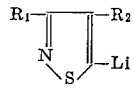

wherein $R_1$ represents a member of the class consisting of hydrogen, alkyl of up to 6 carbon atoms, and carboxyl, and $R_2$ represents a member of the class consisting of hydrogen, halogen, alkyl of up to 6 carbon atoms, and carboxyl.

2. Isothiazol-5-yl lithium.
3. 4-methylisothiazol-5-yl lithium.
4. 3-methylisothiazol-5-yl lithium.
5. 4-bromo-3-methylisothiazol-5-yl lithium.
6. 4-chloroisothiazol-5-yl lithium.
7. 4-bromoisothiazol-5-yl lithium.
8. 4-chloro-3-methylisothiazol-5-yl lithium.
9. 3-methyl-4-iodoisothiazol-5-yl lithium.

References Cited in the file of this patent

Kurkjy et al.: J. Am. Chem. Soc., vol. 74, pages 6260–6262 (1952).